June 26, 1962  G. E. SMITHBURN  3,040,590
DEMOUNTABLE POWER UNIT AND ASSOCIATED IMPLEMENTS
Filed Sept. 8, 1958

INVENTOR.
George E. Smithburn
His Attorney

INVENTOR.
George E. Smithburn

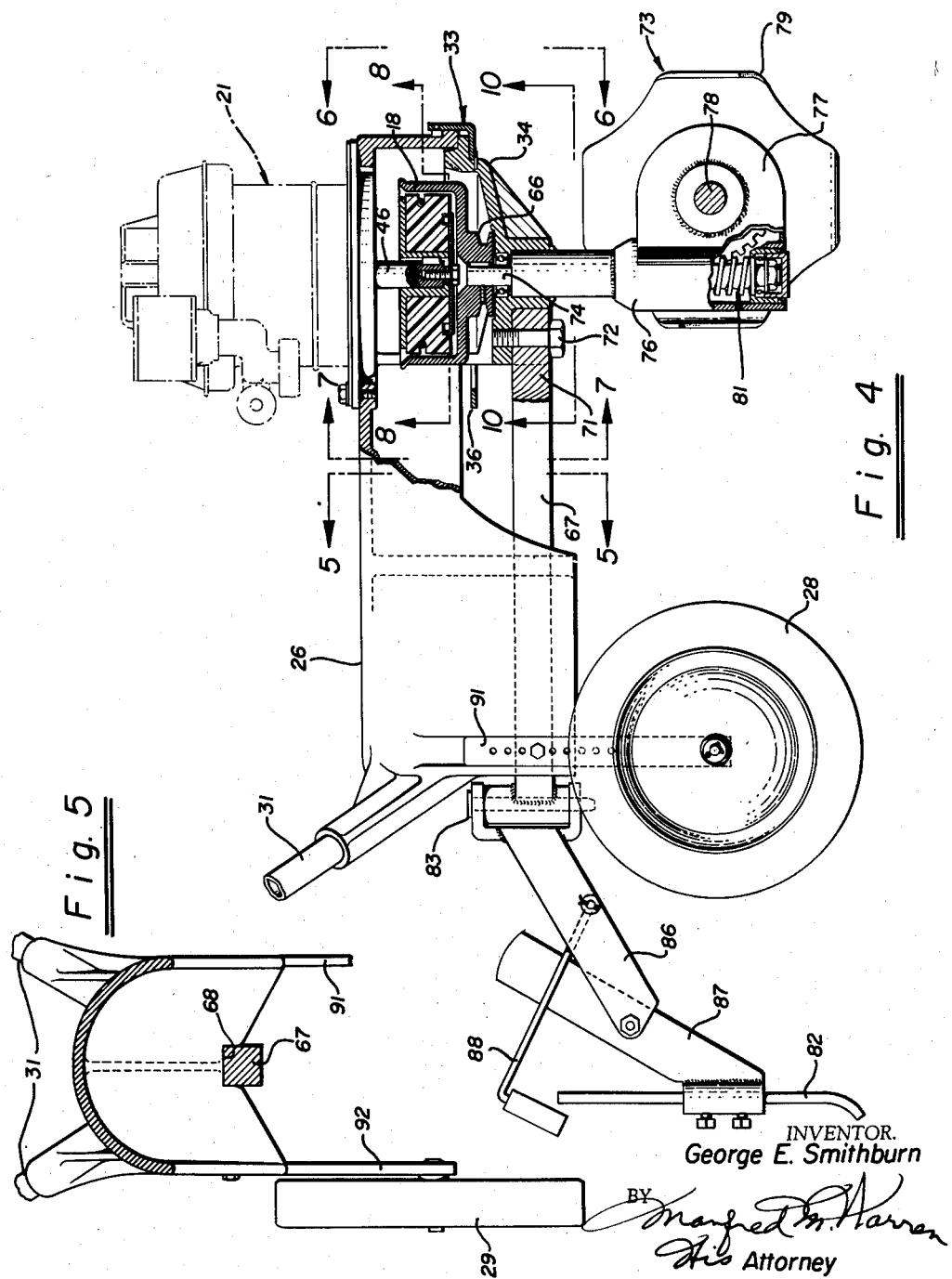

June 26, 1962  G. E. SMITHBURN  3,040,590
DEMOUNTABLE POWER UNIT AND ASSOCIATED IMPLEMENTS
Filed Sept. 8, 1958  8 Sheets-Sheet 5

INVENTOR.
George E. Smithburn
BY
Attorney

June 26, 1962 G. E. SMITHBURN 3,040,590
DEMOUNTABLE POWER UNIT AND ASSOCIATED IMPLEMENTS
Filed Sept. 8, 1958 8 Sheets-Sheet 6

INVENTOR.
George E. Smithburn
BY
His Attorney

June 26, 1962 G. E. SMITHBURN 3,040,590
DEMOUNTABLE POWER UNIT AND ASSOCIATED IMPLEMENTS
Filed Sept. 8, 1958 8 Sheets-Sheet 7

INVENTOR.
George E. Smithburn
BY
His Attorney

June 26, 1962 G. E. SMITHBURN 3,040,590
DEMOUNTABLE POWER UNIT AND ASSOCIATED IMPLEMENTS
Filed Sept. 8, 1958 8 Sheets-Sheet 8

INVENTOR.
George E. Smithburn
BY Manfred M Warren
His Attorney

United States Patent Office 3,040,590
Patented June 26, 1962

3,040,590
DEMOUNTABLE POWER UNIT AND ASSOCIATED IMPLEMENTS
George E. Smithburn, 805 Gilman St., Berkeley, Calif.
Filed Sept. 8, 1958, Ser. No. 759,771
1 Claim. (Cl. 74—16)

The invention relates to domestic, essentially residential, type power driven implements such as garden cultivators, lawn mowers, and the like.

An object of the present invention is to provide a single demountable power unit which may be used with and applied to a line of implements of the character above described, and in which the operative connection of the demountable power unit to the implement may be effected simply, easily and with very little effort or strain and particularly with minimum lifting effort on the part of the user.

Another object of the present invention is to provide a demountable power unit and associated implements of the character described in which the drive connection may be controlled automatically from the engine throttle and wherein such connection is automatically engaged and disengaged in the running and the idle conditions respectively of the engine.

A further object of the present invention is to provide a demountable power unit and associated implements of the character above which are composed of a minimum number of ruggedly constructed parts capable of providing a long and useful life with minimum attention, adjustment or repair.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claim.

Referring to said drawings:

FIGURE 4 is a side elevation partly in section showing the power unit and implement in fully assembled position.

FIGURE 5 is a fragmentary cross-sectional view of the assembly taken substantially on the plane of line 5—5 of FIGURE 4.

Figure 1:
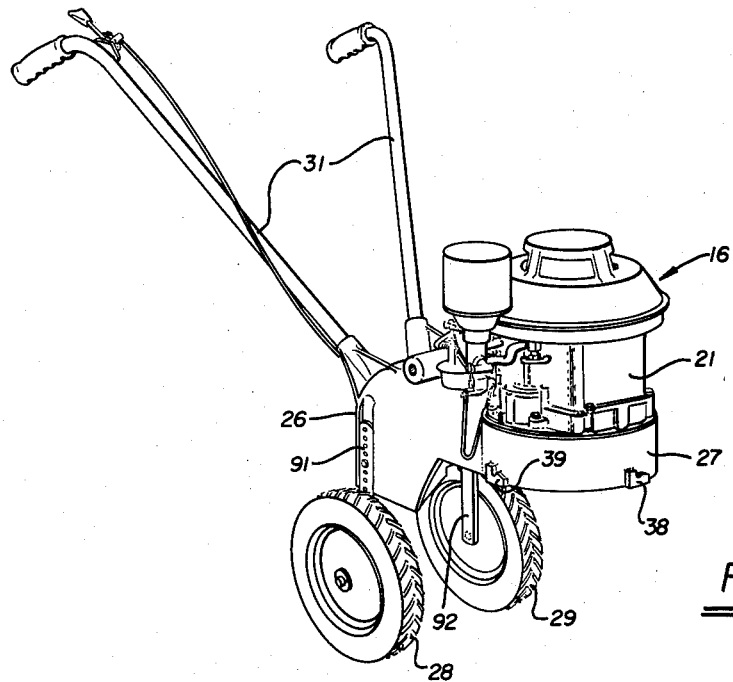
FIGURE 1 is a perspective view of a demountable power unit constructed in accordance with the present invention.
Figure 2:
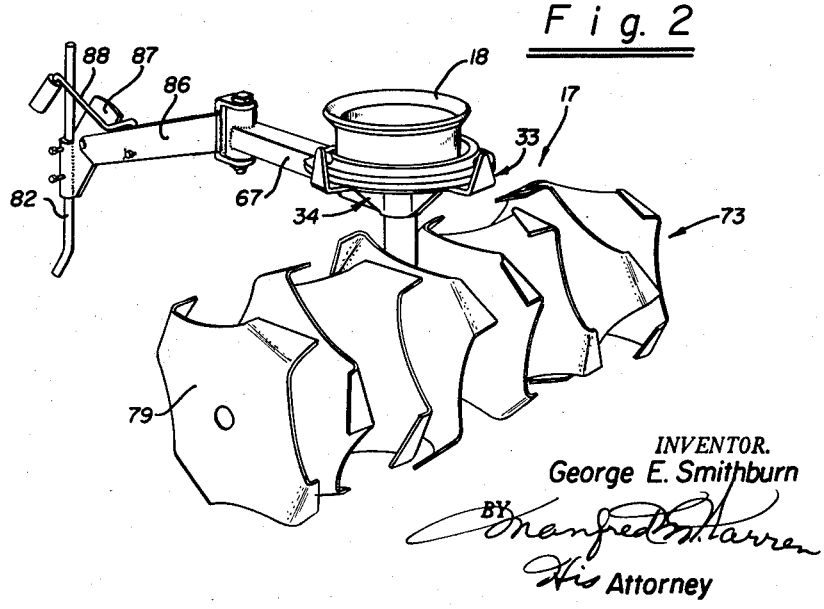
FIGURE 2 is a perspective view of a garden cultivating implement constructed in accordance with the present invention.

With reference to the accompanying drawings, the demountable power unit 16 of the present invention and as generally depicted in FIGURE 1 of the drawings, is adapted for use with and application to any one of a line of power driven implements such as the garden cultivator 17 depicted in FIGURE 2, the associated implement being provided in each instance with a tubular driven member 18. The demountable power unit 16 is composed briefly of an engine 21, having an implement drive connection 22, see FIGURE 3, which includes a centrifugally expanding drive chuck dimensioned for mounting in the tubular drive member 18 and which is moveable from a contracted position out of engagement with the driven member, see FIGURE 8, to an expanded position in driving engagement with the driven member, see FIGURE 9, in response to the idle and running conditions respectively of the engine 21.

Figure 3:
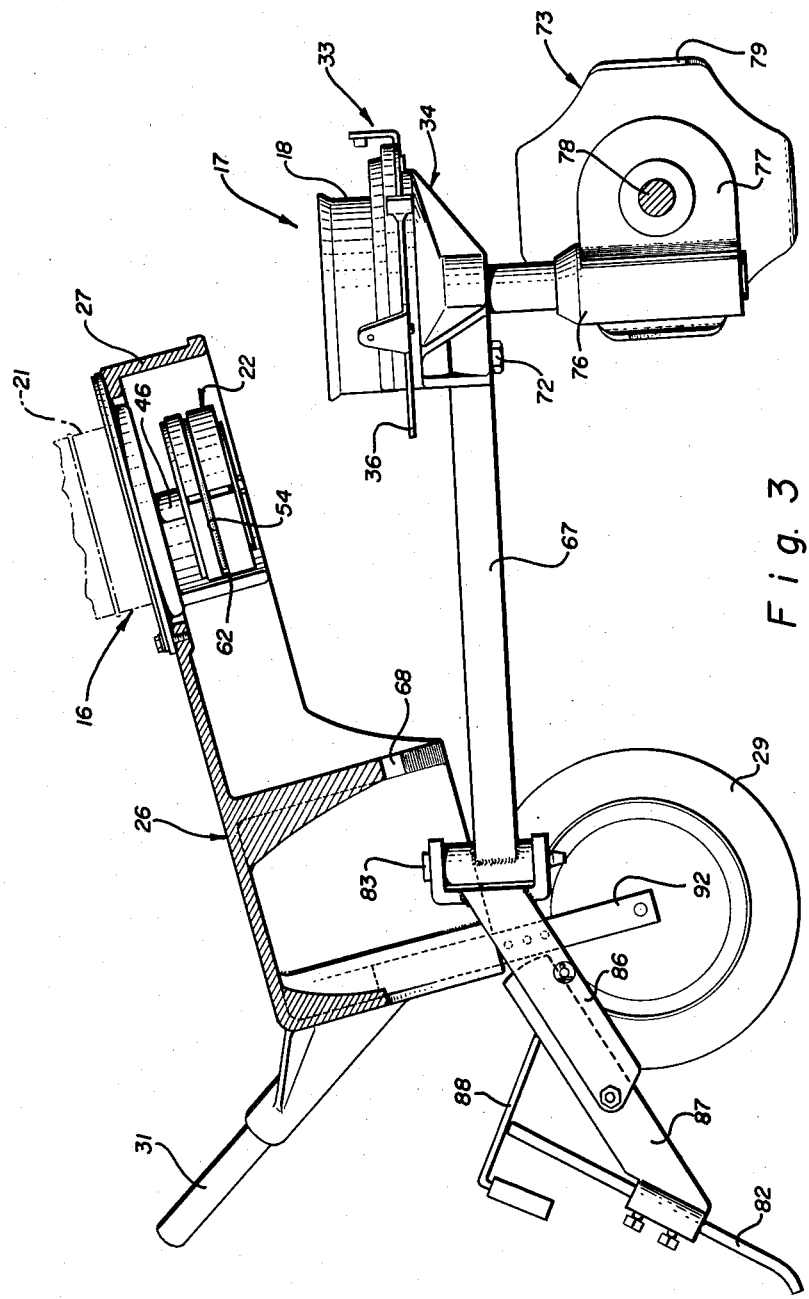
FIGURE 3 is a side elevation partly in cross-section showing the power unit and implement in partially assembled position.
Figure 6:
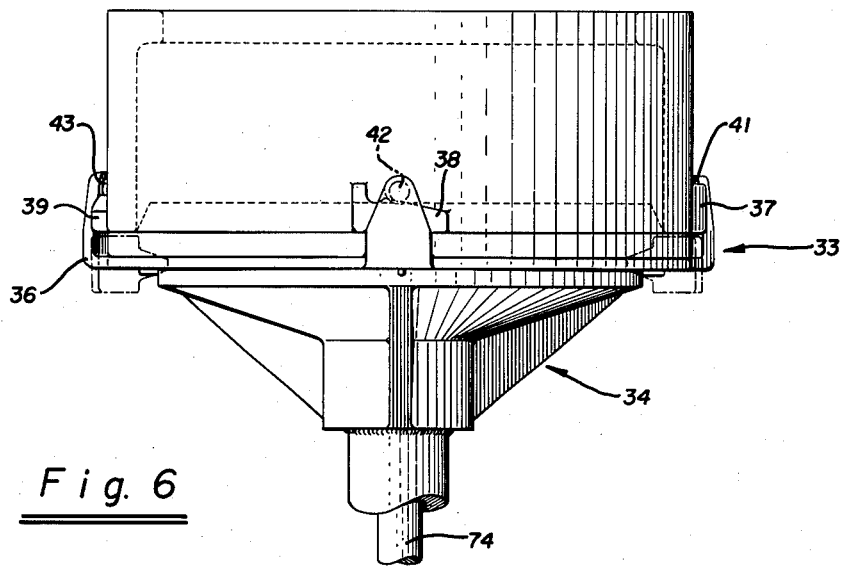
FIGURE 6 is a fragmentary front elevation of the assembly taken substantially on the plane of line 6—6 of FIGURE 4.
Figure 7:
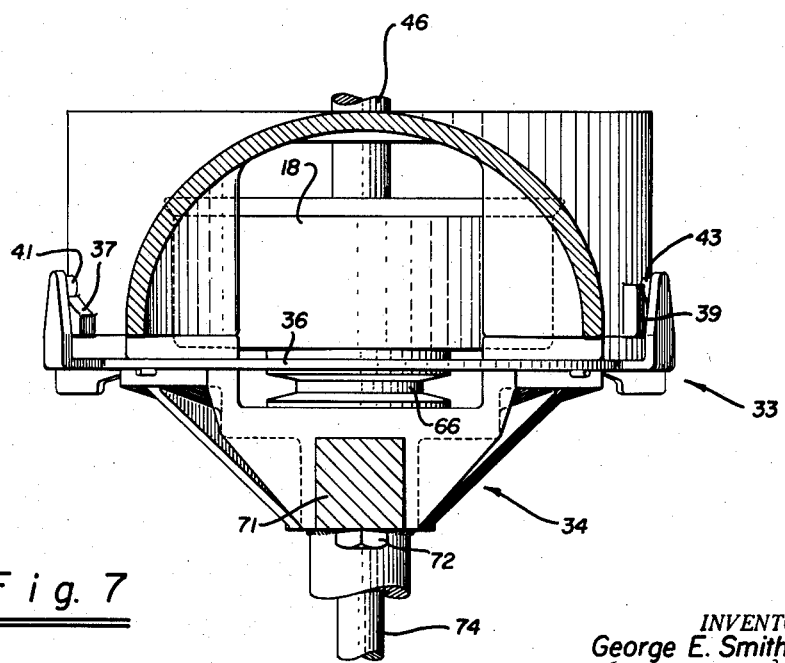
FIGURE 7 is a fragmentary cross-sectional view of the assembly as shown in FIGURE 4 and taken substantially on the plane of line 7—7 of FIGURE 4.

As a feature of the present invention the drive and driven members are vertically set for easy vertical telescoping engagement and to facilitate such engagement the demountable power unit is provided with a carriage 26 which supports the engine 21 adjacent the forward end 27 of the carriage and includes a pair of rearwardly set wheels 28 and 29 and a rearwardly and upwardly extending handle 31 for manually wheeling the unit about and for raising and lowering the engine and drive connection 22 for attachment to one of the associated implements as generally depicted in FIGURE 3. Preferably the demountable power unit is simply wheeled into position over the implement as illustrated in FIGURE 3, and then lowered to internest the drive and driven members as depicted in FIGURE 4. When the units have been thus positioned, interengaging fastening means 33 on the implement and the carriage are actuated for securing the drive chuck 22 and driven member 18 in their proper internested and concentric relation.

This fastening means 33 is here composed of an annular locking ring 36 mounted for rotation on the housing 34 of the implement concentric to the driven member 18; a plurality of circumferentially spaced cam lugs 37, 38, and 39, see FIGURES 1, 6, 7, and 10, on the forward circular front end 27 of the carriage concentric to the drive chuck 22; and circumferentially spaced pin means (rollers) 41, 42 and 43 carried by the ring 36 for interlocking engagement with the lugs 37–39 to secure the implement and unit rigidly together with the drive chuck 22 and driven member 18 in internested concentric relation.

Figures 8, 9, 10:
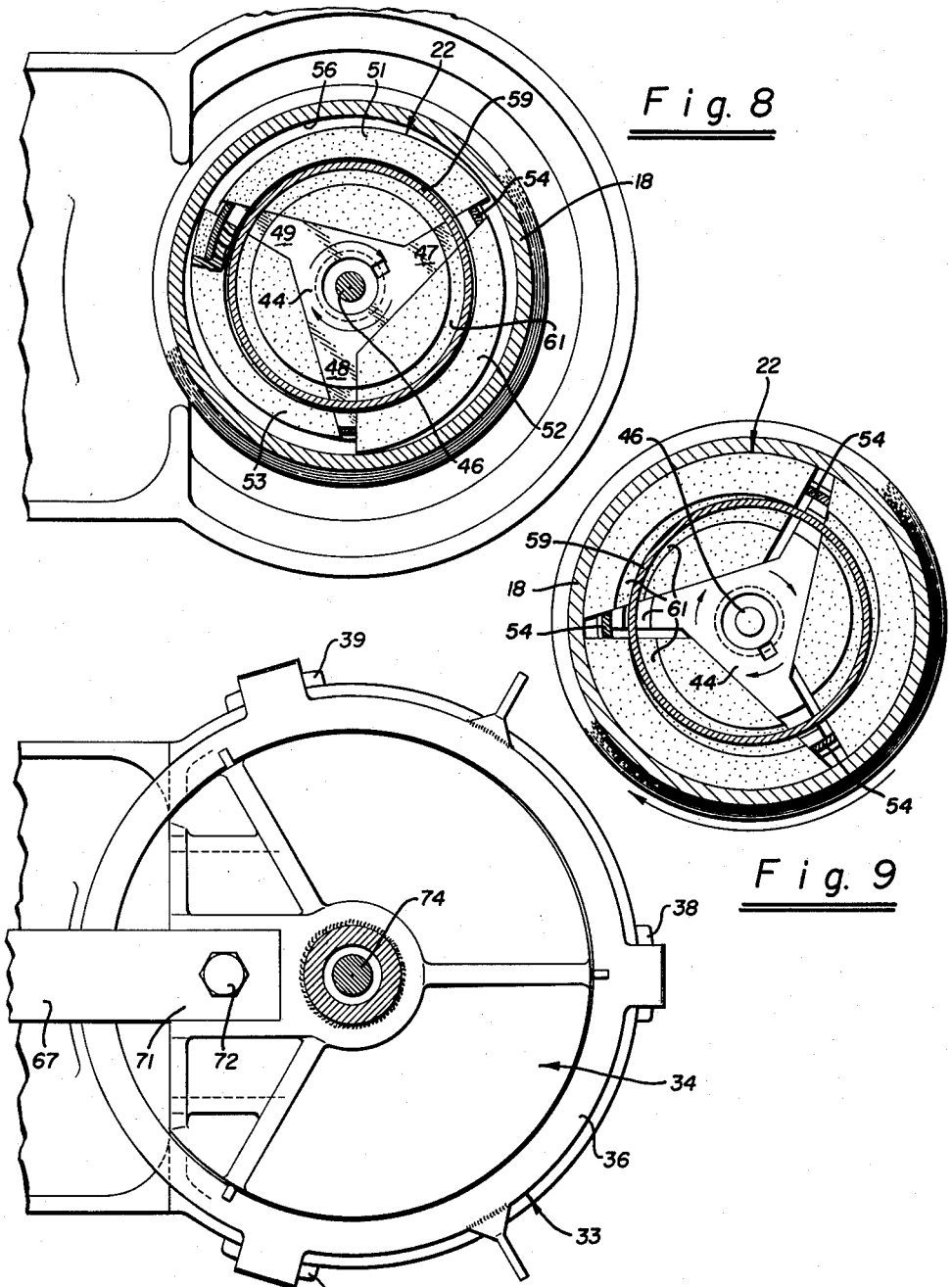
FIGURE 8 is a fragmentary horizontal cross-sectional view of the assembly as shown in FIGURE 4 and taken substantially on the plane of line 8—8 of FIGURE 4.
FIGURE 9 is a horizontal cross-sectional view similar to FIGURE 8 but showing the clutch elements engaged.
FIGURE 10 is a fragmentary horizontal cross-sectional view of the assembly as shown in FIGURE 4 and taken substantially on the plane of line 10—10 of FIGURE 4.
Figure 11:
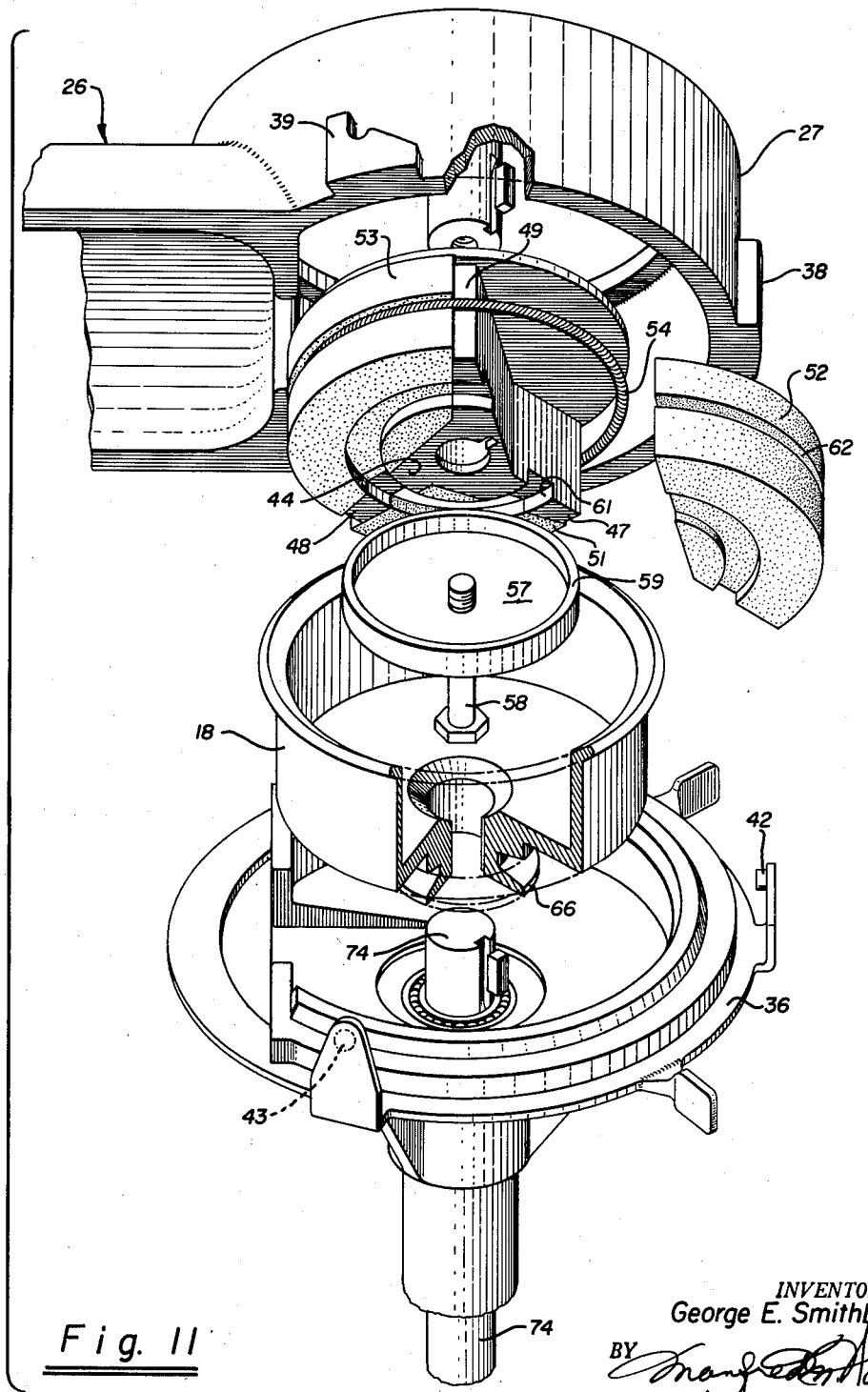
FIGURE 11 is an exploded perspective view of the drive connection between the power unit and implement.

The drive chuck 22 is here composed of a hub 44 mounted on and keyed to the engine shaft 46 for rotation therewith and having a plurality of generally radially set vanes 47, 48, and 49, see FIGURES 8, 9, and 11: a plurality of brake block members 51, 52, and 53 slidably carried by the vanes for radial reciprocation; and spring means 54 urging the block members 51–53 to a radially retracted position spaced from the interior wall 56 of the driven member as seen in FIGURE 8; the block members moving outwardly in response to engine speed to effect automatic clutching of the driven member as illustrated in FIGURE 9. As will be best seen from FIGURES 4 and 11, the several brake block members are supported vertically by an underlying plate 57 secured by bolt 58 to the lower end of engine shaft 46 and which is provided with an upturned peripheral flange 59 which engages in circumferential grooves 61 in the bottom surfaces of the block members. Preferably the vanes 47–49 are shaped as illustrated in FIGURES 8 and 9 to provide a wedge type action driving the blocks 51–53 tightly against the wall 56 and to provide a sort of self-energizing gripping action of the brake blocks against the wall 56 when under load. The brake blocks are formed with aligned circumferential groove 62 for accommodating the spring 54 and the latter may be of simple helical form as illustrated in the drawing, having sufficient strength to pull the blocks 51–53 away from wall 56 when the engine speed slows down to its idling condition. If desired, and as here shown, the base or hub 66 of the driven member 18 may be formed with a peripheral V-belt groove to provide an auxiliary power take-off.

Preferably the implement housing 34 is provided with an arm projecting generally radially therefrom and the carriage 26 is formed with a straddling keyway 68, see FIGURES 3 and 5, for receiving the arm and locking the implement against rotation relative to the carriage about the axis of the drive connection. By reason of this construction, the inner engaging means 33 need only secure the implement and carriage against vertical separation leaving the support for the rotating movement to the arm 67 and keyway 68. For convenience and as seen in FIGURE 4, the forward end 71 of arm 67 may be secured by bolt 72 in a receiving socket formed in the housing 34.

The specific form of implement illustrated in FIGURES 1–12 of the drawing, and as best seen in FIGURES 2, 3, and 4, is that of a garden cultivator, and includes a ground tilling mill 73 journalled by the implement housing 34; a drive connection, see FIGURE 4, carried by the housing and terminating in the vertically set tubular drive member 18. This drive connection here includes a vertical shaft 74 secured to and depending from the driven member 18 and journalled in a vertically set sub-housing 76 having a horizontal offset 77 at its lower end which supports and journals the mill shaft 78 which in turn carries a plurality of earth tilling tines 79. A worm and pinion drive 81 as seen in FIGURE 4 is used to transfer power from shaft 74 to the mill shaft 78.

The garden cultivator type of implement customarily includes a drag stake 82 which is here carried by and depends from arm 67 and which cooperates with the mill to provide a free standing structure as generally depicted in FIGURE 2. Preferably and as here shown, the drag stake 82 depends from arm 67 in a generally downwardly and rearwardly extending direction and has a swivel connection 83 to the arm permitting swinging movement of the drag stake about a substantially vertical axis. As here shown, the drag stake also includes a pair of pivotally connected arms 86 and 87 for adjusting the angle and height of the drag stake and the arms 86 and 87 may be held in adjusted position by a manually displaceable latch bar 88. Further adjustment of the unit is provided by mounting the wheels 28 and 29 on vertical arms 91 and 92 which are carried for vertical adjustment by the carriage housing 26.

Figure 12:
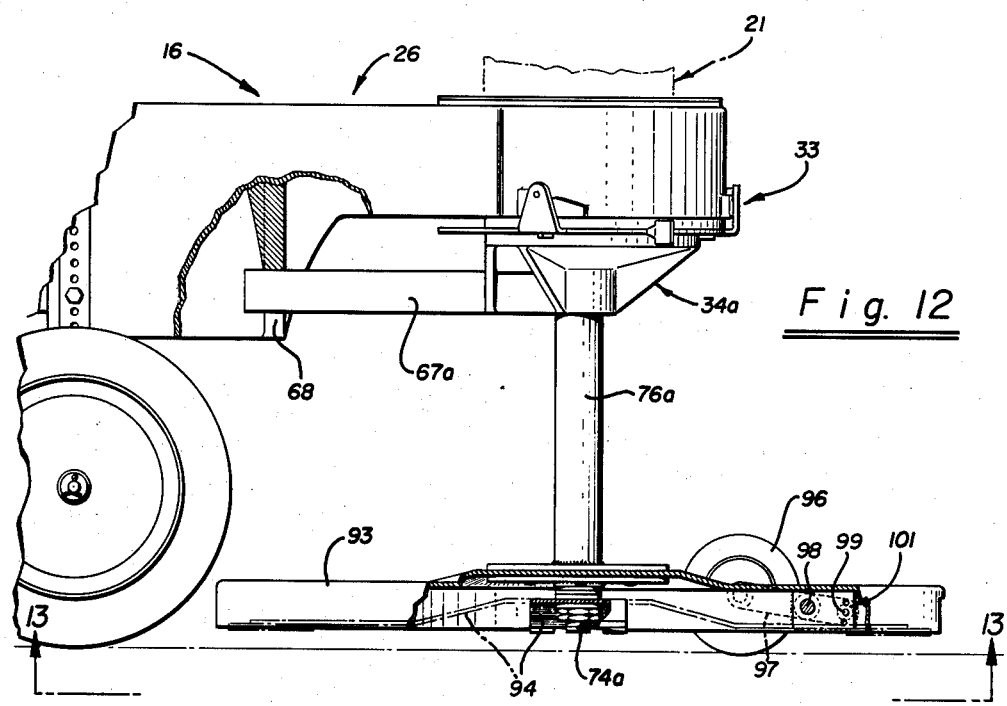
FIGURE 12 is a side elevation partially in section showing a modified form of implement.
Figure 13:
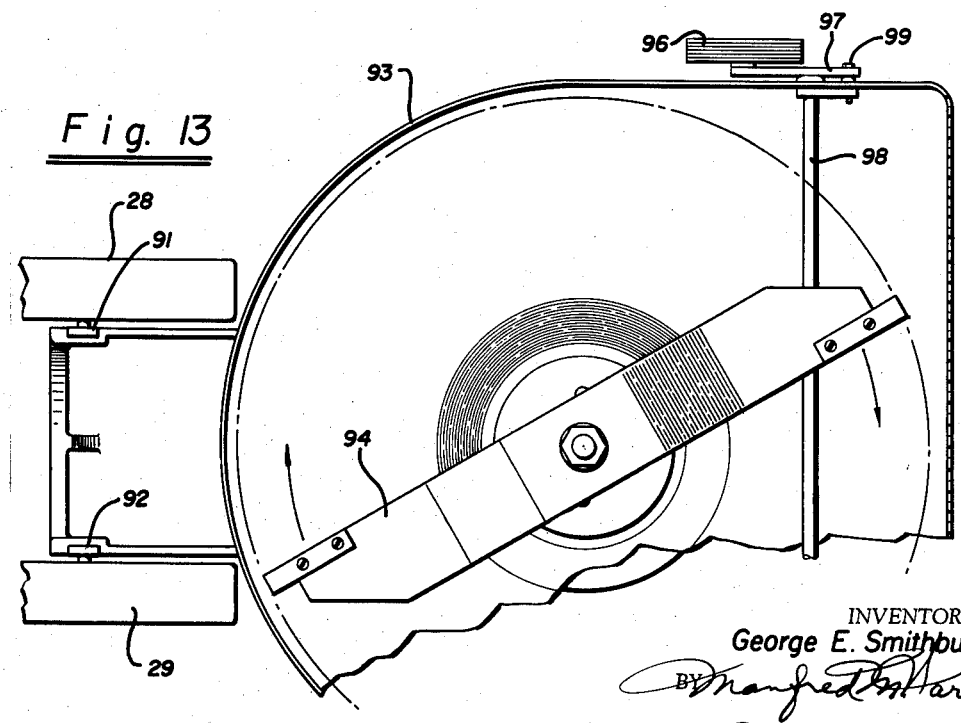
FIGURE 13 is a bottom view of the implement illustrated in FIGURE 12.

The power driven implement illustrated in FIGURES 12 and 13 is a lawn mower here composed of a tubular sub-housing 76a depending from the implement housing 34a and supporting at its lower end an inverted pan-shaped housing 93 including a rotary grass cutting blade 94. Blade 94 is fastened to the lower end of implement shaft 74a which extends from the tubular driven member identical to member 18 in the above-described embodiment. In this lawnmower embodiment the demountable power unit 16 is identical with the above described unit and has also the inter-connecting means 33 and the drive and driven members 22 and 18. Housing 34a is provided with an arm extension 67a as in the first embodiment except that arm 67a need extend only to the straddling keyway 68 rather than to be extended on rearwardly for the support of the drag stake as in the first embodiment. The blade housing 93 is preferably supported on a pair of wheels 96 carried at the opposite sides of the housing 93 on offset arms 97 attached to the ends of a through axle 98. Adjustment of the wheel heights may be effected by rotating arms 97 relative to the housing 93 and pins 99 are carried by arms 97 for engagement through one of the series of selectable openings 101 in the housing, see FIGURE 12, for holding the wheels in adjusted position.

Figure 14:
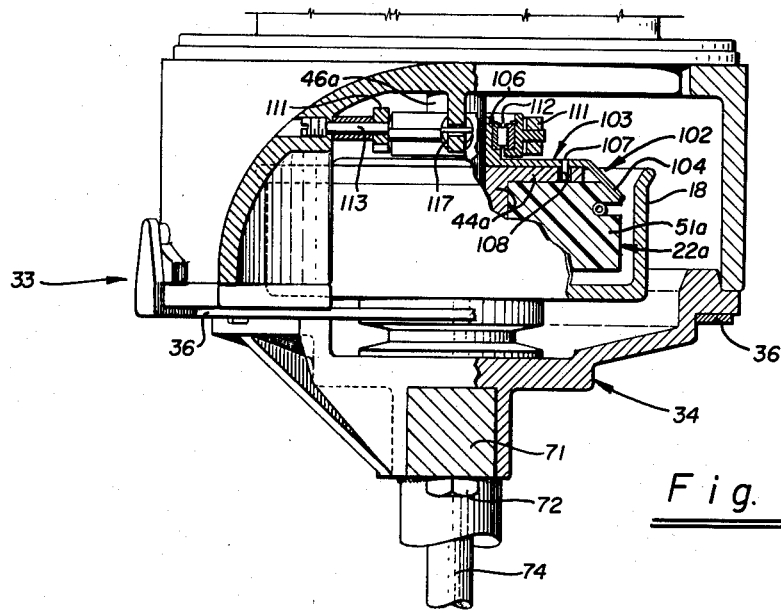
FIGURE 14 is a side elevation partly in section of the driving connection incorporating the manually operable clutch.
Figure 15:
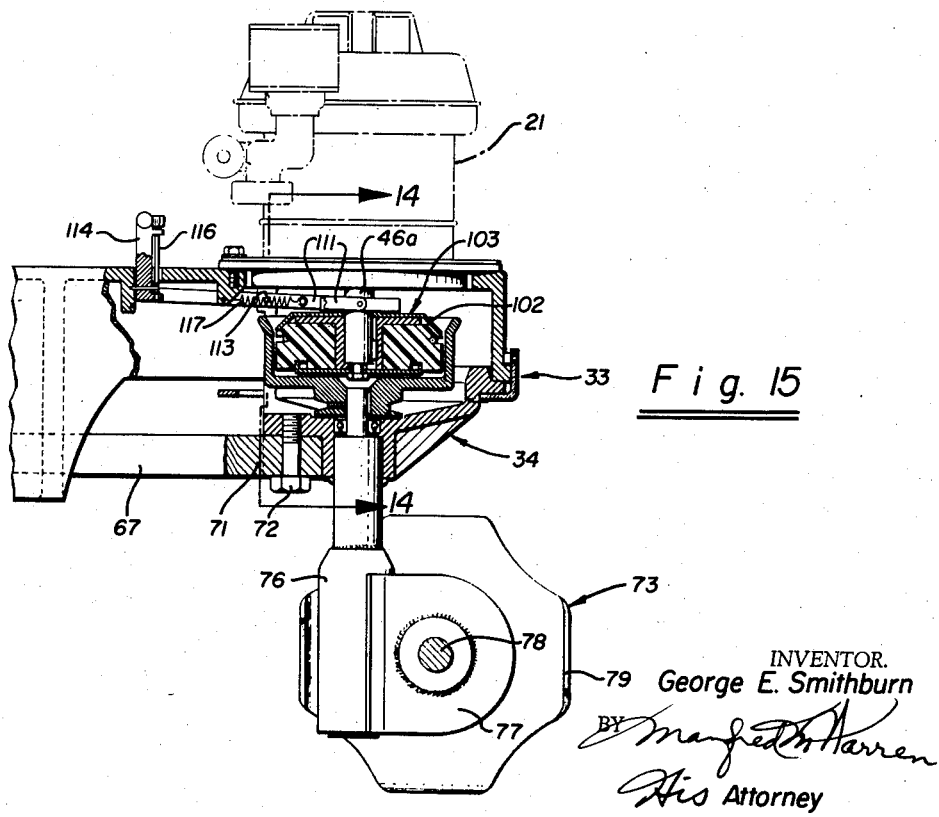
FIGURE 15 is a fragmentary cross-sectional view on a reduced scale of the mechanism illustrated in FIGURE 14 and is taken substantially at right angles to the showing of FIGURE 14.

A further modified form of the invention is illustrated in FIGURES 14 and 15 where manually controlled means is provided for restraining the automatic expansion of the drive chuck 22a in response to higher engine speeds. Such a means is desirable for preventing the operation of the implement when the demountable power unit and implement are attached, as for example the period of starting and warming up the engine. It is frequently desirable to start the engine under a full throttle condition and also not to engage the drive until the engine has been put through a warming up cycle. The manually controlled means 102 here includes an inverted dish-shaped member 103 mounted for movement longitudinally of engine shaft 46a to and from the block members 51a and into and out of radial interlocking engagement therewith. As here shown, the upper corners of the several block members 51a are chamfered so as to fit into a correspondingly bevelled peripheral flange portion 104 of member 103 when the block members are in their inwardly retracted position and to restrain the block members against outward movement.

As will be best seen from FIGURE 14, the hub 106 of member 103 is mounted for longitudinal reciprocation on engine shaft 46a and the member is held for rotation with the shaft by a pin 107 carried thereby and engaging in an opening 108 in the hub 44a of the drive chuck. Longitudinal reciprocation of the restraining member 103 to and from the brake blocks 51a is hereby effected by a pair of levers 111 straddling the hub 106 as a yoke and being secured thereto by a roller bearing 112. Levers 111 are pivoted at 113 to the carriage housing and extend beyond the pivot 113 to a manually engageable handle 114. The latter is provided with a latch 116 to hold it in one or a pair of up and down adjusted positions corresponding to the engaged and disengaged positions of the restraining member 103 with the brake block members 51a. An over center spring 117 is here connected to the levers and the housing for affording a positive displacement of the levers to the two terminal positions noted.

I claim:

A demountable power unit comprising, an engine having a vertically set implement drive connection, and a carriage therefor including a pair of rearwardly set wheels and a rearwardly and upwardly extending handle for manually wheeling said unit about and for raising and lowering said engine and drive connection; an associated power driven implement having a vertically set hollow cylindrical driven member dimensioned to receive said drive connection; an annular locking ring mounted for rotation on said implement concentric to said driven member, a plurality of circumferentially spaced cam lugs on said unit concentric to said drive connection, and circumferentially spaced pin means carried by said ring for interlocking engagement with said lugs, to secure said implement and unit with said drive connection and driven member in concentric relation; said drive connection including a centrifugally expanding chuck moveable from a contracted position out of engagement with said driven member to an expanded position in driving engagement therewith in response to idle and running conditions respectively of said engine.

(References on following page)

References Cited in the file of this patent

UNITED STATES PATENTS

| | | |
|---|---|---|
| 1,428,194 | Von Meyenburg | Sept. 5, 1922 |
| 2,423,979 | Jenson | July 15, 1947 |
| 2,532,424 | Rose | Dec. 5, 1950 |
| 2,634,770 | Mall | Apr. 14, 1953 |
| 2,709,493 | Hupp | May 31, 1955 |
| 2,753,967 | Bowers | July 10, 1956 |
| 2,792,900 | Howard | May 21, 1957 |
| 2,803,183 | Smithburn | Aug. 20, 1957 |
| 2,827,842 | Peterson et al. | Mar. 25, 1958 |
| 2,864,293 | Edrich et al. | Dec. 16, 1958 |
| 2,893,497 | Vellenzer | July 7, 1959 |

FOREIGN PATENTS

| | | |
|---|---|---|
| 841,659 | France | Feb. 13, 1939 |